(12) United States Patent
McCarthy

(10) Patent No.: US 9,582,184 B2
(45) Date of Patent: Feb. 28, 2017

(54) TOUCH SCREEN CONTROL FOR ADJUSTING A NUMERICAL VALUE

(71) Applicant: Keysight Technologies, Inc., Minneapolis, MN (US)

(72) Inventor: Dennis J. McCarthy, Glen Ellen, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 214 days.

(21) Appl. No.: 14/071,561

(22) Filed: Nov. 4, 2013

(65) Prior Publication Data
US 2015/0128093 A1   May 7, 2015

(51) Int. Cl.
*G06F 3/0488* (2013.01)
*G06F 3/0484* (2013.01)

(52) U.S. Cl.
CPC ...... *G06F 3/04883* (2013.01); *G06F 3/04847* (2013.01)

(58) Field of Classification Search
CPC .......... G06F 3/0488–3/04883; G06F 3/0484–3/04847
USPC ........................................ 715/863
See application file for complete search history.

(56) References Cited

U.S. PATENT DOCUMENTS

| | | | | |
|---|---|---|---|---|
| 6,191,785 B1* | 2/2001 | Bertram | ............ | G06F 3/04847 345/157 |
| 6,229,456 B1* | 5/2001 | Engholm | ............ | G01R 19/2516 341/34 |
| 2011/0063248 A1* | 3/2011 | Yoon | ............ | G06F 3/0485 345/174 |
| 2011/0074707 A1* | 3/2011 | Watanabe | ............ | G06F 3/03547 345/173 |
| 2012/0226977 A1* | 9/2012 | Lengeling | ............ | G06F 3/04883 715/702 |
| 2013/0246973 A1* | 9/2013 | Tomiyasu et al. | ............ | 715/830 |

* cited by examiner

*Primary Examiner* — Amy Ng
*Assistant Examiner* — Roland Casillas

(57) ABSTRACT

A method of operating a data processing system having a touch enabled display screen to alter the value of a specified variable in the data processing system is disclosed. A value control is provided on the display screen to alter the variable. The value control has an increment tap region, a decrement tap region, and a drag region. The data processing system recognizes gestures in these regions and changes the variable in response to the gestures by an amount that is determined by the gesture. The drag gesture is characterized by a drag direction and a drag length, the drag direction depending on whether the drag gesture is performed toward the increment or decrement tap regions. The value control is advantageous for small display screens.

14 Claims, 2 Drawing Sheets

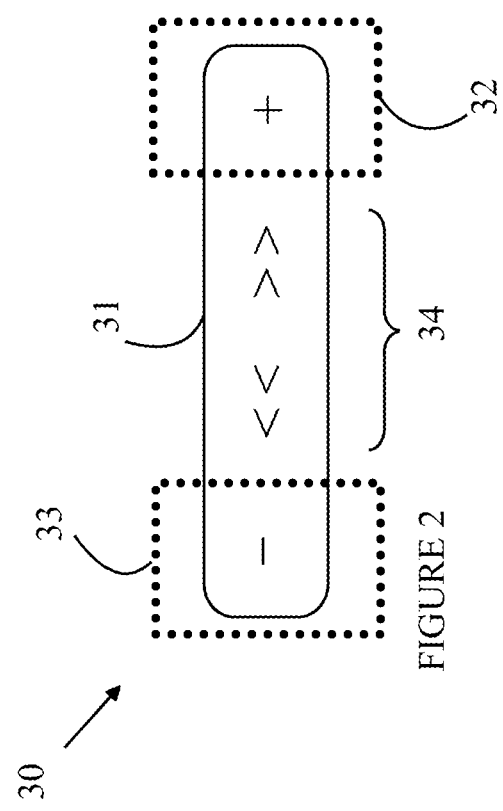

TOUCH SCREEN CONTROL FOR ADJUSTING A NUMERICAL VALUE

BACKGROUND

Touch enabled display screen devices are used to control numerous applications. The user communicates with the underlying application by performing various gestures. The simplest gesture is a simple touching of the screen in a predetermined location to indicate the selection of a corresponding quantity. Virtual keyboards and keypads are implemented with such gestures. Touch screen displays for controlling physical instruments present challenges due to the limited amount of space that is available for providing the controls and the need to see data that is displayed on the screen in addition to any controls. Typically, physical buttons and knobs in the prior instrument design are replaced by "widgets" that are visual displays on the screen with which the user interacts using a touch gesture of some kind. For example, a push button on the original instrument is replaced by a button widget on the touch screen which is activated by the user touching the screen at the location of the button widget.

Widgets for changing numeric values present significant challenges. Typically, a value that controls some function in the instrument must be changed in a particular manner. In some cases, the value needs to be altered in a continuous manner. For example, the amplitude or frequency of a signal generated by an instrument may require adjustment. In other cases, the value needs to be incremented or decremented in steps of a predetermined size that depend on the particular application. For example, the time scale on an oscilloscope display typically uses predetermined steps so that the ticks on the screen are at integer values.

Prior art displays often use number pads on the screen for allowing the user to input a value; however, the number pads occupy a significant fraction of the screen, and hence, interfere with the display of other information that may be needed to correctly set the desired value. Simple button widgets that increment or decrement the value in question are poorly suited to the task of changing the value in a continuous fashion.

Widgets that emulate a slider have been used for changing a value in a continuous manner; however, these widgets have limited accuracy. The ratio of the length of the slider to the size of the contact area between the user's finger and the display limit the precision with which the user can alter the value. Hence, the size of the slider needed for accurately changing a value becomes a problem when there is limited area on the display due to the need for displaying other information while adjusting the value in question.

SUMMARY

The present invention includes a method of operating a data processing system having a touch enabled display screen to alter the value of a specified variable in the data processing system. The method includes providing a value control on the display screen and causing the data processing system to alter the value in response to gestures executed on the value control. The value control has an increment tap region, a decrement tap region, and a drag region. The data processing system recognizes a tap gesture executed in the increment and decrement tap regions and a drag gesture executed in the drag region. The drag gesture is characterized by a drag direction and a drag length, the drag direction depending on whether the drag gesture is performed toward the increment or decrement tap regions. The data processing system changes the variable by an amount that depends on whether the one of the recognized gestures is a tap gesture in the increment tap region, a tap gesture in the decrement tap region, or a drag gesture.

In one aspect of the invention, the data processing system increments the variable by a first amount if the one of the recognized gestures is a tap gesture in the increment tap region and decrements the variable by a second amount if the one of the recognized gestures is a tap gesture in the decrement tap region. The data processing system alters the variable by a third amount if the one of the recognized gestures is a drag gesture, the amount depending on the drag length, the amount increasing the variable if the drag gesture has a first direction and decreasing the variable if the drag variable has a second direction.

In another aspect of the invention, the data processing system provides a list of variables on the display screen and receives input identifying one of the variables in the list from a user of the data processing system. The data processing system assigns the specified variable to be the identified one of the variables.

In a still further aspect of the invention, the data processing system further recognizes a flick gesture in the drag region. The data processing system changes the variable by an amount that depends on the flick gesture.

In one embodiment, the value control includes a substantially elongated rectangular region on the display screen, the increment tap region is at one end of the rectangular region and the decrement tap region is at an opposite end of the rectangular region.

In yet another aspect of the invention, the first, second, and third amounts depend on the specified variable. In one embodiment, one of the first, second, and third amounts depends on previous gestures recognized for the specified variable.

BRIEF DESCRIPTION OF THE DRAWINGS

FIG. 2 illustrates one embodiment of a value control according to the present invention.

DETAILED DESCRIPTION

Figure 1:
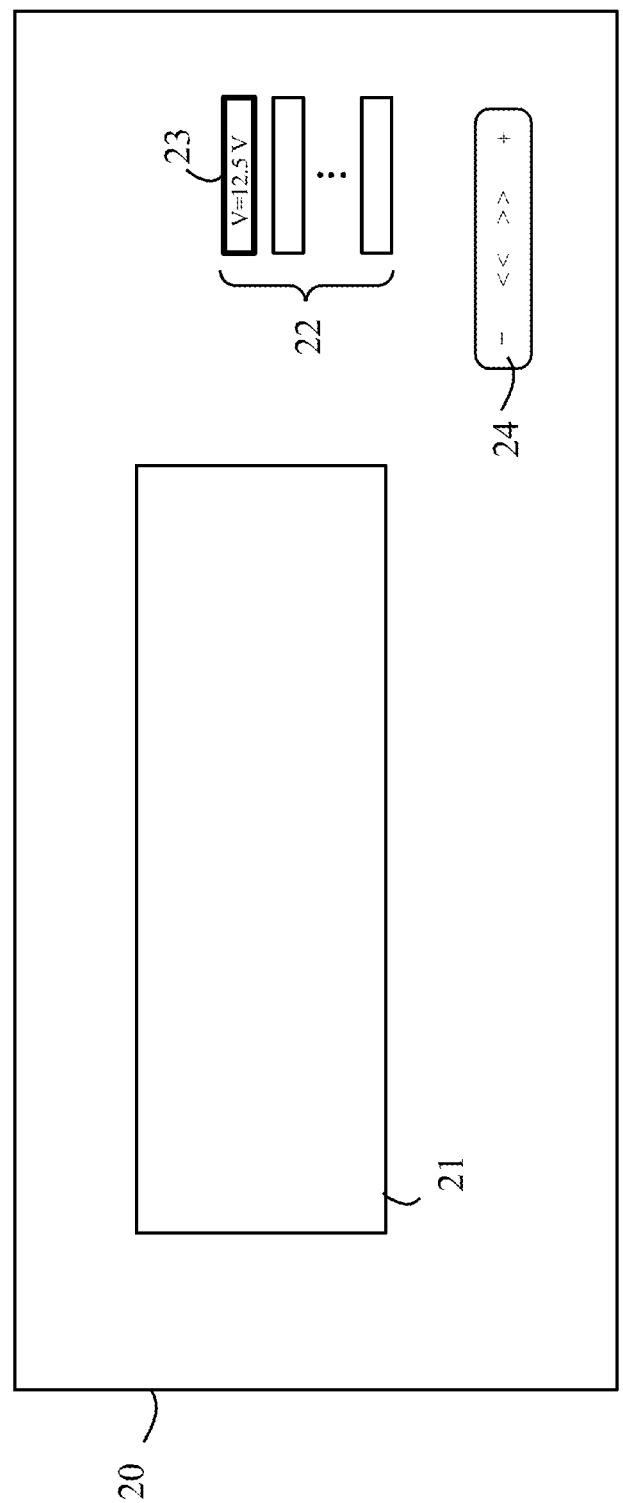
FIG. 1 illustrates an instrument control panel based on a touch screen.

The present invention can be more easily understood with reference to FIG. 1, which illustrates an instrument control based on a touch screen 20 that is controlled by an underlying data processing system. To simplify the drawings, the data processing system that controls the touch screen is not explicitly shown; however, it is to be understood that the touch screen includes any underlying data processing system that interprets the gestures performed on the touch screen and controls the material displayed on the touch screen. Touch screen 20 includes a graphical display area 21 that displays data generated by the instrument. The instrument and displays are controlled by a series of numerical values 22. A user selects one of the values for alteration by touching the displayed value. The data processing system that controls the display receives the user's selection, and the displayed value is then highlighted as shown at 23. The highlighted value is then assigned to value control 24 and altered by the user interacting with a value control 24. The list of values shown at 22 can be invoked by some other gesture or be part of the display that is always present. In one aspect of the invention, a single value control is used to alter multiple values one at a time. This reduces the space needed for widgets that control values in the overall display.

Refer now to FIG. 2, which illustrates one embodiment of a value control according to the present invention. Value control 30 utilizes a substantially rectangular area 31 on the touch screen display. Rectangular area 31 is divided into three regions as shown at 32-34. To increment or decrement the value of the corresponding variable, the user taps region 32 or region 33, respectively. A "tap" gesture is defined as a gesture in which the user touches the region in question with the user's finger or some other object and then lifts the user's finger or object without moving out of the region. In one aspect of the invention, each time the user taps region 32, the corresponding value is incremented by a fixed amount. Similarly, each time the user taps region 33, the corresponding value is decremented by a fixed amount. The manner in which these amounts are specified will be discussed in more detail below.

To change the corresponding value in a continuous manner, the user employs a "drag" gesture. A drag gesture is defined to be a gesture in which the user touches rectangular area 31 with an object such as the user's finger or a stylus and then moves the touch object while maintaining contact with the display screen in a direction that is either toward region 32 or region 33. The drag gesture can be commenced in any region of rectangular area 31. The drag gesture is characterized by a drag length and a drag direction. If the user drags the user's finger toward the "+" tap region, the drag direction is said to be positive. Similarly, if the user drags the user's finger toward the "−" tap region, the drag direction is said to be negative. To increase the value, the user drags the user's finger toward region 32, and to decrease the value, the user drags the user's finger toward region 33. The amount by which the value is increased or decreased depends on the distance through which the user's finger moves during the drag gesture and on a constant that depends on the value being changed. The constant will be referred to as the drag constant in the following discussion. The manner in which the drag constant is specified will be discussed in more detail below.

The maximum distance through which the user can drag the user's finger depends on the particular implementation of the present invention. In one aspect of the invention, the maximum distance is specified by the size of rectangular area 31. For example, the user cannot increase the increment or decrement in the value beyond that signaled by moving the user's finger into regions 32 or 33, depending on the direction of motion. In another aspect, the user can drag the user's finger outside the bounds of rectangular area 31 by a distance that is only limited by the size of the underlying touch display. In either case, there is some maximum change that can be provided by a single drag operation. If the user wishes to change the value by more than this amount, the user can execute another drag gesture by touching the value control in region 34 and dragging the user's finger toward the appropriate end of rectangular area 31 again.

In one aspect of the invention, the current value of the variable being changed is shown in real time in the corresponding region of touch screen 20. For example, the value shown in region 23 in FIG. 1 could be continuously updated as the user changes the value either by a drag gesture or by an increment or decrement tap gesture, thereby providing an indication of the current value during adjustments made by the user.

In another aspect of the invention, the user can also perform a "flick" gesture in rectangular area 31. A flick gesture can be viewed as a drag gesture in which the user's finger is moving at a speed that is greater than some predetermined threshold value when the user's finger is lifted from the touch screen. In this aspect of the invention, the increment applied to the variable in question is greater than the increment that would have been applied if the user merely lifted the user's finger at the end of a drag operation. The amount of the additional increment or decrement depends on the speed with which the user's finger was moving when the user lifted the finger. The amount of additional increment is also determined by one or two constants associated with the value control. A flick can be viewed as emulating a body with mass that is released when the user lifts the user's finger. The mass is also assumed to be subject to friction. The initial speed with which the mass is moving is determined by the speed of the user's finger when the user lifts the finger. The "distance" the mass moves is determined by the value of the constant representing the mass and the value of the frictional forces represented by the friction constant. For the purposes of this discussion, it is sufficient to note that an additional increment is applied to the variable in question, the additional increment depending on one or more setup constants and the speed of the user's finger.

The above-described embodiments utilize various control constants that determine the increment applied to the variable being controlled as a function of the manner in which the value control is operating. For example, in a tap gesture, the amount added or decremented, respectively, to the value being controlled depends on a calibration constant. Similarly, in a drag gesture, there is a constant that specifies the amount by which the value is changed as a function of the distance through which the user drags the user's finger along the value control. In the case of a flick gesture, there are additional calibration constants that specify the added increment or decrement associated with the flick.

In the simplest case, the calibration constants only depend on the value being incremented. Referring again to FIG. 2, each of the variables that can be changed using value control 24 has a set of corresponding calibration constants that are used when that variable is being altered using the value control. When the user selects one of the values shown at 22 for increasing or decreasing, the corresponding calibration constants are loaded into the software that implements value control 24.

In another aspect of the invention, the calibration constants are altered during the value changing operation in response to the manner in which the user is using the value control. For the purposes of this discussion, it will be assumed that there is a separate value control controller that processes the operations performed on value control 24. This software will be referred to as the change controller in the following discussion. In general, the change controller receives information from the underlying operating system that controls touch screen 20. The change controller monitors the operations that are performed in changing the current variable and alters the constants in response to those operations. For example, consider the case in which the user changes the selected value by increasing the value using the "+" tap gesture. If, after a number of taps, the user then taps the "−" control, the change controller assumes that the user has over stepped the desired value and hence is trying to achieve a value between the last two values. In this case, the change controller decreases the step size that results from tapping the increment areas of value control 24.

Similarly, if the user executes a series of tap gestures to change a value and then executes a drag gesture while still working on the same variable, the change controller sets the drag constant such that the change that can be achieved with one drag gesture is determined by the step size of the tap gesture. For example, the change controller could set the maximum range to be the size of the step or a fraction thereof. This provides the user with the ability to refine the value in fewer operations. In contrast, if the user selects a variable for change and starts the operation with a drag gesture, the drag constant is set to the stored drag constant that could be much different than tap gesture constant.

In another aspect of the invention, touch screen 20 is a pressure sensitive screen, and the change controller measures the pressure of the user's finger on the surface in the area of value control 24. If the user presses harder than a predetermined pressure threshold, the calibration constants are increased by a predetermined amount so that the value changes more rapidly as a function of the user's operations. For example, the amount of change per unit distance of motion during the continuous change mode would be increased if the user presses harder on the screen. Similarly, if the pressure exerted during a tap is greater, the increment or decrement could be increased.

In another aspect of the invention, the change controller monitors the time of contact during a tap gesture. If the user holds his or her finger on the tap area for an extended period of time, the change controller increases or decreases the step size constant depending on whether the tap gesture was "+" gesture or a "−" gesture, respectively.

A value control according to the present invention can be implemented on any data processing system that includes a touch enabled display screen. The data processing system can include small handheld devices such as tablet computers or smart phones or larger conventional computer systems such as desktop personal computers. The value control is particularly advantageous on small screens because of the efficiency with which it uses the screen area. For the purposes of this discussion, a small display screen is one in which the textual data must be shown in a font of 8 points or less. Similarly, if the graphical information being displayed requires a display resolution that is as fine as the maximum resolution of the display, the screen is defined to be small.

The present invention also includes a computer readable medium that stores instructions that cause a data processing system to execute the method of the present invention. A computer readable medium is defined to be any medium that constitutes patentable subject matter under 35 U.S.C. 101. Examples of such media include non-transitory media such as computer memory devices that store information in a format that is readable by a computer or data processing system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method of operating a data processing system having a touch enabled display screen to alter a value of a specified variable in said data processing system, said method comprising:

providing a value control on said touch enabled display screen, said value control having an increment tap region, a decrement tap region, and a drag region, said data processing system recognizing a tap gesture executed in said increment and decrement tap regions and a drag gesture executed in said drag region, said drag gesture being characterized by a drag direction and a drag length, said drag direction depending on whether said drag gesture is performed toward said increment or decrement tap regions; and causing said data processing system to change said specified variable by an amount that depends on whether said one of said recognized gestures is a tap gesture in said increment tap region, a tap gesture in said decrement tap region, or a drag gesture, wherein said data processing system increments said specified variable by a first amount if said one of said recognized gestures is a tap gesture in said increment tap region, said first amount remaining constant during a continuous sequence of said tap gestures to said increment tap region, decrements said specified variable by a second amount if said one of said recognized gestures is a tap gesture in said decrement tap region, said second amount remaining constant during a continuous sequence of said tap gestures to said decrement tap region, and alters said specified variable by a third amount if said one of said recognized gestures is a drag gesture, said amount depending on said drag length, said amount increasing said specified variable if said drag gesture has a first drag direction and decreasing said specified variable if said drag gesture has a second drag direction, said first, second, and third amounts depending on said specified variable, and, in response to a first one of said tap gestures followed by an immediate second one of said tap gestures in a different tap region from that corresponding to said first one of said tap gestures, reducing, one of said first, second, and third amounts, said one of said first, second, and third amounts being different from said one of said first, second, and third amounts corresponding to said first one of said tap gestures.

2. The method of claim 1 wherein said first amount depends on a pressure applied to said increment tap region, said amount increasing with increased pressure and having more than two values as a function of pressure.

3. The method of claim 1 further comprising causing said data processing system to provide a list of possible variables on said touch enabled display screen;

receiving input identifying one of said possible variables from a user of said data processing system; and causing said data processing system to assign said specified variable to be said identified one of said possible variables.

4. The method of claim 1 wherein said data processing system further recognizes a flick gesture in said drag region, said data processing system changes said specified variable by an amount that depends on said flick gesture.

5. The method of claim 1 wherein said value control comprises an elongated region on said touch enabled display screen, said increment tap region being at one end of said elongated region and said decrement tap region being at an opposite end of said elongated region, said drag region being between said increment tap region and said decrement drag region.

6. The method of claim 1 wherein said third amount depends on a previous gesture applied to one of said increment tap region or said decrement tap region that caused said data processing system to increment or decrement said specified variable.

7. The method of claim 1 further comprising providing a display indicating a current value for said specified variable, said display being continuously updated as said data processing system changes said specified variable in response to said recognized gestures.

8. A non-transitory computer readable medium comprising instructions that cause a data processing system having a touch screen to execute a method for operating said touch screen, said method comprising:

provuiding a value control on said touch screen, said value control having an increment tap region, a decrement tap region, and a drag region, said data processing system recognizing a tap gesture executed in said increment and decrement tap regions and a drag gesture executed in said drag region, said drag gesture being characterized by a drag direction and a drag length, said drag direction depending on whether said drag gesture is performed toward said increment or decrement tap regions; and causing said data processing system to change said specified variable by an amount that depends on whether said one of said recognized gestures is a tap gesture in said increment tap region, a tap gesture in said decrement tap region, or a drag gesture wherein said data processing system increments said specified variable by a first amount if said one of said recognized gestures is a tap gesture in said increment tap region, said first amount remaining constant during a continuous sequence of said tap gestures to said increment tap region, decrements said specified variable by a second amount if said one of said recognized gestures is a tap gesture in said decrement tap region, said second amount remaining constant during a continuous sequence of said tap gestures to said decrement tap region, and alters said specified variable by a third amount if said one of said recognized gestures is a drag gesture, said amount depending on said drag length, said amount increasing said specified variable if said drag gesture has a first drag direction and decreasing said specified variable if said drag gesture has a second drag direction, said first, second, and third amounts depending on said specified variable, and, in response to a first one of said tap gestures followed by an immediate second one of said tap gestures in a different tap region from that corresponding to said first one of said tap gestures, reducing, one of said first, second, and third amounts, said one of said first, second, and third amounts being different from said one of said first, second, and third amounts corresponding to said first one of said tap gestures.

9. The non-transitory computer readable medium of claim 8 wherein said first amount depends on a pressure applied to said increment tap region, said amount increasing with increased pressure and having more than two values as a function of pressure.

10. The non-transitory computer readable medium of claim 8 further comprising causing said data processing system to provide a list of possible variables on said touch screen;

receiving input identifying one of said possible variables from a user of said data processing system; and causing said data processing system to assign said specified variable to be said identified one of said possible variables.

11. The non-transitory computer readable medium of claim 8 wherein said data processing system further recognizes a flick gesture in said drag region, said data processing system changes said specified variable by an amount that depends on said flick gesture.

12. The non-transitory computer readable medium of claim 8 wherein said value control comprises an elongated region on said touch screen, said increment tap region being at one end of said elongated region and said decrement tap region being at an opposite end of said elongated region, said drag region being between said increment tap region and said decrement tap region.

13. The non-transitory computer readable medium of claim 8 wherein said third amount depends on a previous gesture applied to one of said increment tap region or said decrement tap region that caused said data processing system to increment or decrement said specified variable.

14. The non-transitory computer readable medium of claim 8 further comprising providing a display indicating a current value for said specified variable, said display being continuously updated as said data processing system changes said specified variable in response to said recognized gestures.

* * * * *